J. J. CLIFFORD.
VALVE.
APPLICATION FILED MAY 19, 1919.
1,378,217.
Patented May 17, 1921.
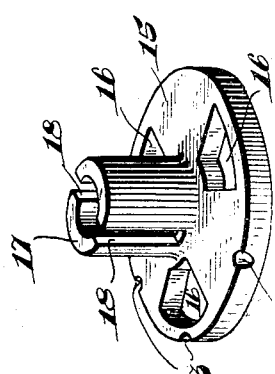
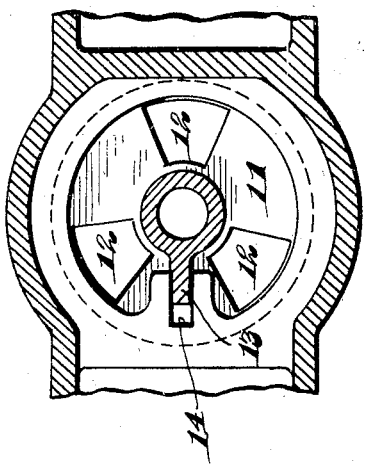
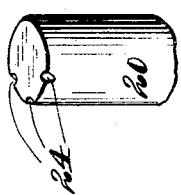
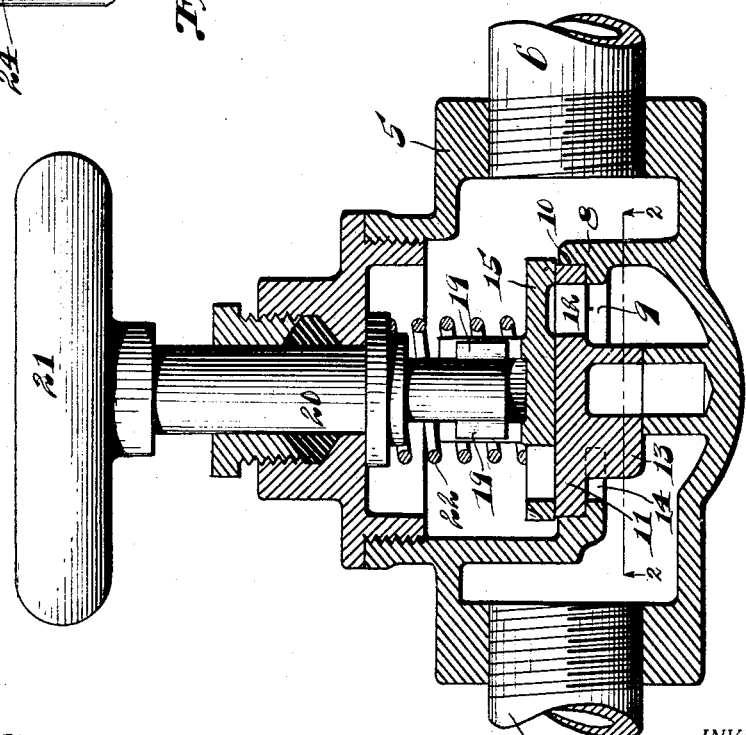
Witnesses:
C. E. Wessels
B. G. Richards
INVENTOR.
John J. Clifford,
BY
ATTORNEY.

UNITED STATES PATENT OFFICE.

JOHN J. CLIFFORD, OF CHICAGO, ILLINOIS, ASSIGNOR TO HARRY D. LATHROP, OF CHICAGO, ILLINOIS.

VALVE.

1,378,217.      Specification of Letters Patent.      Patented May 17, 1921.

Application filed May 19, 1919. Serial No. 298,020.

*To all whom it may concern:*

Be it known that I, JOHN J. CLIFFORD, a citizen of the United States, and a resident of the city of Chicago, county of Cook, and State of Illinois, have invented certain new and useful Improvements in Valves, of which the following is a specification.

My invention relates to improvements in valves, and has for its object an improved construction of this character by means of which both the valve and valve seat may be readily renewed in case of wear or the like.

Other objects will appear hereinafter.

The invention consists in the combinations and arrangements of parts hereinafter described and claimed.

The invention will be best understood by reference to the accompanying drawings forming a part of this specification, and in which, Figure 1, is a longitudinal section of a valve embodying the invention, Fig. 2, a horizontal section taken on line 2—2 of Fig. 1, Fig. 3, a perspective view of a valve head employed in the construction, and Fig. 4, a perspective view of the upper end of a valve stem employed in the construction.

The preferred form of construction, as illustrated in the drawings, comprises a suitable valve casing 5, having the usual inlet pipe 6 and outlet pipe 7. The valve casing 5 is divided internally, by a partition 8, into the usual inlet and outlet compartments, and the partition 8 is provided with an opening or passage 9 for the passage of fluid through the valve. The opening 9 is surrounded by an annular recess 10, having the bottom and sides thereof nicely finished to a seating surface. A valve seat 11 is nicely fitted within the recess 10, the bottom and periphery of said valve seat being nicely finished to seat upon the bottom and sides of the recess 10 to form a fluid-tight joint. The valve seat 11 is provided with three spaced valve openings 12, which, when open, permit of the flow of the fluid through the valve. On its under side the valve seat 11 carries a radial lug 13, removably fitting a notch 14 provided in the partition 8, said lug and notch engagement preventing turning of the valve seat in the recess 11 and insuring a definite and constant location of the valve seat in said recess. The upper surface of the valve seat 11 is also nicely finished to form the sealing surface of the valve, and a circular valve head 15 is arranged to coöperate with said valve seat, the bottom surface of said valve head being nicely finished to seat upon the upper surface of the valve seat. The valve head 15 is provided with three spaced openings 16 adapted to be brought into and out of registration with the valve openings 12 in the valve seat 11 upon rotation of said valve head. Valve head 15 carries on its upper side a hub 17 having radial notches 18 in opposite sides thereof adapted to receive lugs 19 on the lower end of the valve stem 20. Valve stem 20 is equipped with the usual operating wheel or handle 21, and a compression spring 22 is interposed between said valve stem and said valve head, as shown, to hold said valve head to its seat. Marks 23 are formed, as indicated, in the edges of valve head 15, and coöperating marks 24 are formed on the upper edge of the valve stem 20, said marks being arranged and adapted to indicate the proper association of the valve stem with the valve head and valve seat, the parts being so arranged that when the valve seat is in position with its lug 13 in engagement with notch 14, and the marks 24 of the valve stem are in radial registration with the marks 23 on the valve head, the parts are properly assembled for coöperation, thus tending to prevent mistakes in assembling of the parts. It will be observed that the casing 5 is provided with a removable plug threaded therein and giving access to the valve 15 and valve seat 11, the opening for said plug being of a diameter to permit of the free passage of both the valve and valve seat. In assembling the parts, the valve seat 11 is first placed in the valve casing through the plug opening and it will be observed that the arrangement is such that the valve seat can be placed in but one position so that the ports 12 therein will always occupy the same position. Then the valve 15 is assembled with the stem 20, care being taken to assemble said valve and stem with the markers 23 on the valve in registration with the markers 24 on the valve stem. This may be done before the valve and valve stem are placed in position or the valve may be first inserted in the casing on the valve seat and the valve stem and plug subsequently assembled, care being taken to effect this with said markers in registration.

After the parts have been thus assembled the indicator markers 24 in the upper edge of the valve stem 20 are visible from the outside of the valve casing, so that these markers serve as a means for indicating to the operator the relative position of the valve 15 although valve 15 is then fully concealed within the valve casing. Thus by observing the markers 24 the operator can tell when the valve is fully open, partly open or fully closed, and it is practically impossible to assemble the parts in any different relation. By this arrangement, when the normal sealing surfaces between the valve head and the valve seat 11 become worn or scored from use so that the efficiency of the valve is impaired, the valve may be readily repaired by removing the scored valve head and seat and substituting a new valve head and seat therefor. The old valve head and seat may then be readily refinished and rendered capable of renewed use. The specific form and arrangement of parts is one capable of economical manufacture and ready assembling, without danger of mistakes.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A valve, comprising a valve casing; a removable valve seat in said casing, having a valve opening extending therethrough; a rotary valve head coöperating with said seat and having a valve opening extending therethrough, and adapted to be brought into and out of registration with the opening in said valve seat; and a removable valve stem for said valve head, said valve stem and valve head having registering marks thereon indicating proper registration with each other and said valve seat, substantially as described.

2. A valve comprising a valve casing; a removable valve seat in said casing, said valve seat itself having a valve seating in said casing, said valve seat being finished flat and having a valve opening extending therethrough; a rotary valve head coöperating with said seat and having a valve opening extending therethrough and adapted to be brought into and out of registration with the opening in said valve seat; and a removable valve stem for said valve head, said valve stem and valve head having registering marks thereon indicating proper association with each other and said valve seat, substantially as described.

3. A valve comprising a valve casing; a removable valve seat in said casing, said valve seat itself having a valve seating in said casing, said valve seat being finished flat and having a valve opening extending therethrough; interlocking elements on said valve seat and casing preventing turning of said seat in said casing; a rotary valve head coöperating with said seat and having a valve opening extending therethrough and adapted to be brought into and out of registration with the opening in said valve seat; and a removable valve stem for said valve head, said valve stem and valve head having registering marks thereon indicating proper association with each other and said valve seat, substantially as described.

4. A valve comprising a valve casing divided into inlet and outlet compartments by a partition having a valve opening extending therethrough, there being an annular recess surrounding said valve opening, the bottom and sides of said recess being finished to form a valve seating; a removable circular valve seat fitting in said recess, said valve seat being finished to seat upon the sides and bottom of said recess and also being finished flat on its normal seating surface and having a valve opening extending therethrough; an interlocking notch and lug engagement between said valve seat and said valve casing, preventing turning of said seat in said recess; a rotary valve head seating on said flat finished surface of said valve seat and having a valve opening extending therethrough adapted to be brought into and out of registration with the opening in said valve seat; a slotted hub on said valve head; and a removable valve stem having a lug fitting in the slot in said hub, said valve stem and valve head having registering marks thereon indicating proper association with each other and said valve seat, substantially as described.

In testimony whereof I have signed my name to this specification in the presence of two subscribing witnesses.

JOHN J. CLIFFORD.

Witnesses:
JOSHUA R. H. POTTS,
HELEN F. LILLIS.